Feb. 27, 1962  K. W. VOERTMAN ETAL  3,022,749
PNEUMATIC SUSPENSIONS FOR VEHICLES
Filed April 3, 1959  3 Sheets-Sheet 1

KENNETH W. VOERTMAN
RICHARD L. LICH
By Francis T. Burgess
ATTORNEY.

Feb. 27, 1962 K. W. VOERTMAN ETAL 3,022,749
PNEUMATIC SUSPENSIONS FOR VEHICLES
Filed April 3, 1959 3 Sheets-Sheet 2

INVENTORS:
KENNETH W. VOERTMAN
RICHARD L. LICH
By Francis T. Burgess
ATTORNEYS

Feb. 27, 1962 K. W. VOERTMAN ETAL 3,022,749
PNEUMATIC SUSPENSIONS FOR VEHICLES
Filed April 3, 1959 3 Sheets-Sheet 3

INVENTORS:
KENNETH W. VOERTMAN
RICHARD L. LICH
BY Francis T. Burgess
ATTORNEY.

United States Patent Office 3,022,749
Patented Feb. 27, 1962

3,022,749
PNEUMATIC SUSPENSIONS FOR VEHICLES
Kenneth W. Voertman, St. Louis, and Richard L. Lich, Ferguson, Mo., assignors to General Steel Industries, Inc., a corporation of Delaware
Filed Apr. 3, 1959, Ser. No. 804,006
15 Claims. (Cl. 105—199)

The invention relates to vehicle suspension arrangements and consists particularly in means for compensating for the effect on level-regulated air springs of transversely relatively inclined spring-supporting structures at opposite ends of a vehicle.

In railway cars and other vehicles in which the body is supported by flexible wall pneumatic springs, each of the springs is controlled by a height-responsive valve whereby, if any or all of the springs are compressed below a predetermined height, additional air will be admitted to the spring or springs so compressed until the normal spring height is reached, or, if the springs are expanded in excess of a predetermined height, air will be exhausted from the springs until the normal spring height is reached. Thus, for example, if one end of a car is on transversely horizontal tangent track, and the other end is on superelevated curved track, the height responsive device associated with the laterally-spaced springs at each end of the car will tend to maintain the car body in transverse parallelism with the spring supporting structure, which, however, is level at one end and inclined at the other end because of the relative inclination of the supporting track structure at the two ends. If the car body is reasonably rigid, the level regulating systems at the opposite ends of the car will oppose each other; that is, the tendency of the level regulating system at the end of the car on tangent track will be to maintain the entire car body parallel transversely to the horizontal plane of the tangent track surface, thus causing the level regulating valve on the outer side of the super-elevated curved track end to admit additional air to the spring at that side, and the valve on the inner side on the curved track end to continue to exhaust air. The tendency of the valves on the curved track end to maintain the car body parallel to the inclined transverse plane of the track on the super-elevated curve, has a similar effect on the level regulating valves at the tangent track end of the car.

Among the solutions suggested for this problem has been the provision of a three-point arrangement of the level regulating valves, i.e., two valves at one end laterally spaced apart and each connected separately to the adjacent air spring at that end, and a single centrally-disposed valve at the other end communicating with both air springs at that end. This arrangement is disadvantageous in that total reliance for stability against lateral roll or tilting is placed on the two-valve end of the vehicle and the other end may be relatively unstable. Although this arrangement may be entirely satisfactory on relatively short vehicles, such as busses, it would be of doubtful utility on a relatively long vehicle such as a standard railway passenger car, which may be as much as 85 feet long.

Accordingly, a principal object of the invention is to provide an air spring system in which a vehicle body is supported on laterally-spaced air springs at both ends and the admission and exhaustion of air to and from each spring is separately regulated by laterally-spaced valves each associated with a separate spring whereby maximum roll stability may be achieved, the valves being so arranged and connected as to eliminate opposition between the two spring systems.

The above and other objects and advantages of the invention will be apparent from the following description, reference being made to the accompanying drawings, wherein.

Figure 1:
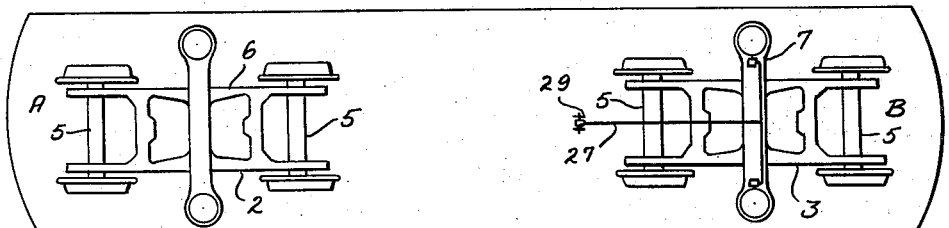
FIGURE 1 is a diagrammatic plan view of a railway car embodying the invention.
Figure 2:
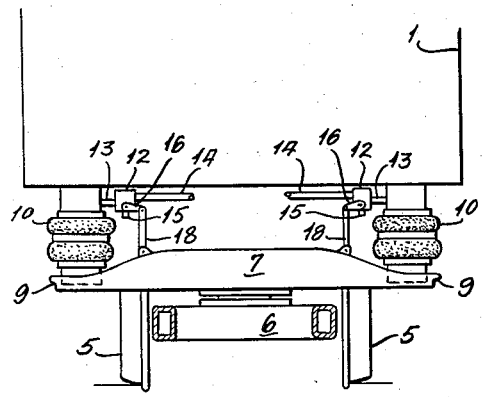
FIGURE 2 is a transverse vertical sectional view of a truck at the left-hand end of FIGURE 1.
Figure 3:
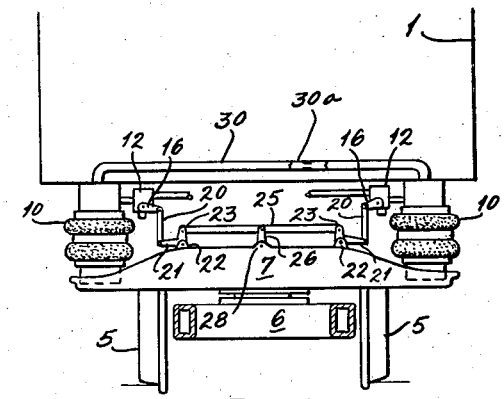
FIGURE 3 is a transverse vertical sectional view of a truck at the right-hand end of FIGURE 1.

Referring now to the drawings, particularly to FIGURES 1 to 4, car body 1 is supported at its left and right hand ends, denominated A and B, respectively, on a pair of trucks 2 and 3 spaced apart longitudinally of the car. The trucks each consist of longitudinally-spaced wheel and axle assemblies 5, a rigid frame 6 supported therefrom and a bolster 7 pivotally supported on frame 6 on a vertical axis at the center of the frame. The ends of the bolster extend substantially outwardly laterally of the wheels and are provided with upwardly facing cup-like pockets 9, in which are seated upright bellows-type flexible wall pneumatic springs 10. Adjacent each of the springs 10 the car body rigidly mounts a valve 12 of a type well-known in the art and having a passage 13 communicating with the spring, a passage 14 communicating with a source of compressed air and an exhaust port 15. The valves 12 are each operated by an arm 16, arranged so that when it is substantially parallel to the car floor, all ports of the valve will be closed, and when it is rotated upwardly from this position the spring passage 13 will be connected to the compressed air passage 14 so as to admit additional air to the spring, and when it is rotated downwardly from the closed position, the spring connecting passage 13 to spring 10 will be connected to the exhaust port 15.

On the truck at the A-end of the car, valve operating arms 16 are each connected to an upright pitman 18 which is pivotally connected at its lower end to the bolster so that if a vertical force is applied to the car body 1 tending to compress one of the springs, the pitman 18 will urge the valve actuating arm 16 upwardly, thereby connecting the associated spring, through passage 13 and passage 14, to a source of compressed air and thus expand the spring until its normal height is reached at which point pitman 18 will return operating arm 16 to its normal horizontal position thus closing the valve. Conversely, if one of the springs is unloaded and hence expanded, its pitman will move its actuating arm downwardly so as to connect the spring, through passage 13 to exhaust port 15, thus exhausting air from the spring until its normal height is reached.

The truck at the other or B-end of the car is substantially identical to that at the A-end except for the connections of the valve actuating arms 16. Instead of being directly connected to the bolster by pitman 18 as are the arms 16 on the valves at the A-end truck, arms 16 are each connected by an upright rod 20 to a substantially normal horizontal arm 21 of a bell crank pivoted at 22 to the bolster and having a substantially normally upright arm 23. The upright arms 23 of bell cranks 21, 23 are connected to each other by a transversely extending horizontal rod 25 which is pivotally secured at its midpoint to a normally upright crank 26, rigidly mounted on the end of a shaft 27, pivoted at one end to the bolster as at 28, and anti-rotatably secured to the car body at 29. If the car body is caused to incline transversely at the A-end by virtue of the operation of the leveling valves as described above, its inclination will be transmitted by shaft 27 to arm 26 on the B-end truck bolster, which will cause each of the bell cranks 21, 23 to be similarly inclined with corresponding rotations of the oppositely disposed actuating arms 16 and consequent admission of air to the valve on the high side of the car and exhausting of air from the valve on the low side of the car.

For equalizing air pressures in the two springs at the B-end of the car in the event that any substantial differences in pressure should develop through faulty operation of the valves or associated linkages, while at the same time permitting the spring to act independently during normal operation of the system, the B-end springs are connected by an air line 30, restricted as at 30a.

Figure 4:
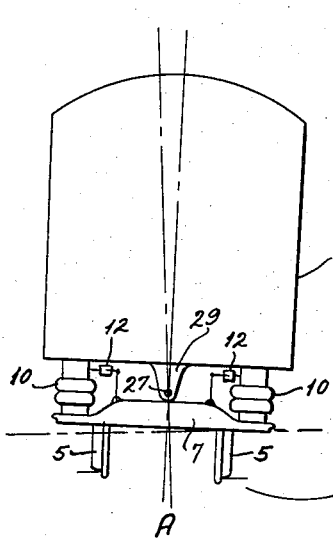
FIGURE 4 is a pair of diagrammatic transverse views showing the relative configurations of the body suspension structure at the opposite ends of the car illustrated in FIGURES 1–3 when the opposite ends of the car are on transversely relatively inclined track sections.
Figure 4:
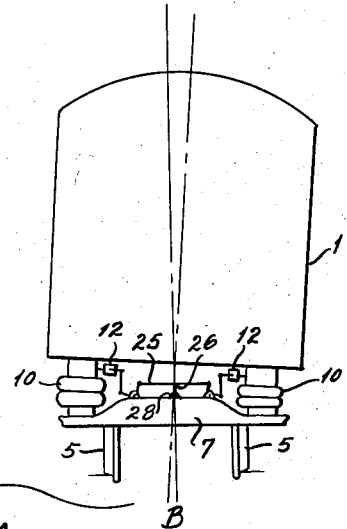
Figure 5:
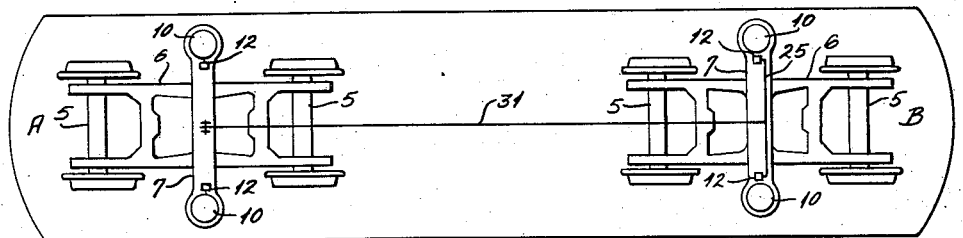
FIGURE 5 is a diagrammatic plan view of a railway car embodying a second form of the invention.
Figure 6:
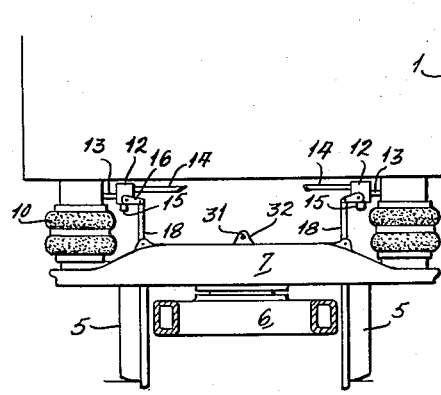
FIGURES 6 and 7 are transverse vertical sectional views of the trucks shown respectively at the left-hand and right-hand ends of FIGURE 5.
Figure 7:
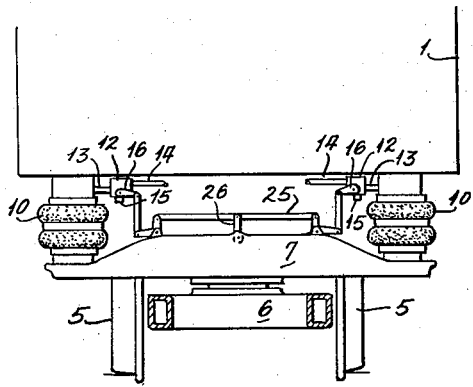
Figure 8:
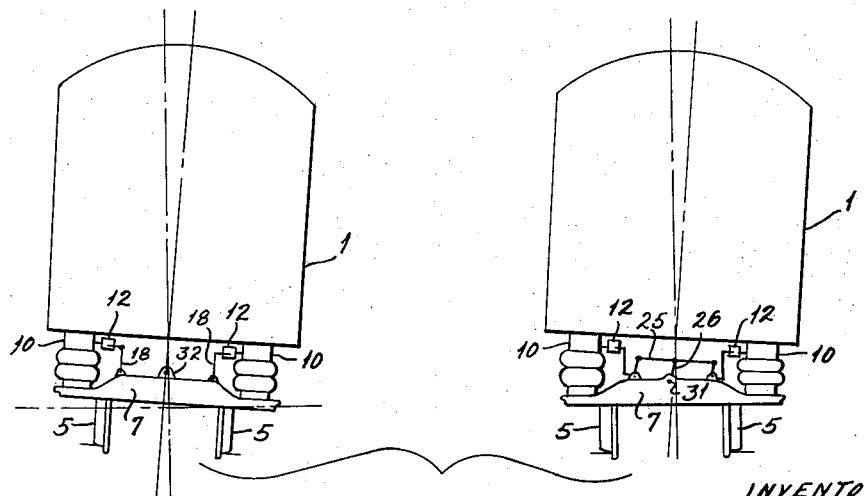
FIGURE 8 is a pair of diagrammatic transverse views showing the relative configuration of the suspension structures at the opposite ends of the car when the supporting track is transversely relatively inclined at the two ends.

FIGURE 4 shows an example of the operation of this device where the A-end of the car is on a super-elevated curve and the B-end of the car is on a transversely level tangent. Because of the absence of a connection between the two leveling valves 12 at the A-end, each valve will maintain its associated spring at the same predetermined height and will maintain the vehicle body parallel to the bolster which, because of the super-elevation of the track, will be similarly inclined transversely of the track, resulting in a corresponding inclination of the vehicle body. At the B-end, the inclination of the vehicle body will be transmitted through shaft 27 to crank 26 which will cause clockwise rotation of crank 26 and the bell crank 21, 23. This will result in an upward movement of the arm 16 of the left hand valve 12 and a downward movement of the arm 16 of the right hand valve thus admitting additional air to the left-hand valve and exhausting air from the right-hand valve until the inclination of the car body is such that the valve arms are parallel to the car body, at which time the valves will be closed and the car body will be stably supported at the B-end at the same inclination as at the A-end.

In the second embodiment of the invention, illustrated in FIGURES 5 through 8, the same reference numerals are used to indicate structure corresponding to the embodiment of FIGURES 1 to 4, and the arrangement is identical except that instead of connecting the central crank 26 to a shaft affixed to a car underframe adjacent the B-end truck, this crank is connected to a shaft 31, the opposite end of which is anti-rotatably secured at 32 to an upstanding bracket on the bolster of the A-end truck. Although slightly more complex, in that a longer shaft is required to connect the B-end truck to the bolster of the A-end truck, this structure is otherwise advantageous as compared to the first embodiment, in that the effect of the A-end truck when positioned on a super-elevated curve, for example, is transmitted immediately to the leveling valve linkage on the B-end truck whereas in the first embodiment the operation of the B-end linkage is delayed somewhat, being dependent on the functioning of the leveling valves at the A-end to tilt the car body in accordance with the inclination of the track and bolster at the A-end. Operation of this embodiment on curved track is as follows: With the A-end on a curved super-elevated track section, the bolster 7 of the A-end truck will be maintained substantially parallel to the transverse plane of the track and this bolster inclination will be transmitted directly through shaft 31 to the crank 26 and associated leveling valve linkage on the B-end truck, thus causing an actuation of the leveling valves at the B-end simultaneous with the actuation of the A-end valves and eliminating any tendency of the two systems to oppose each other.

Figure 9:
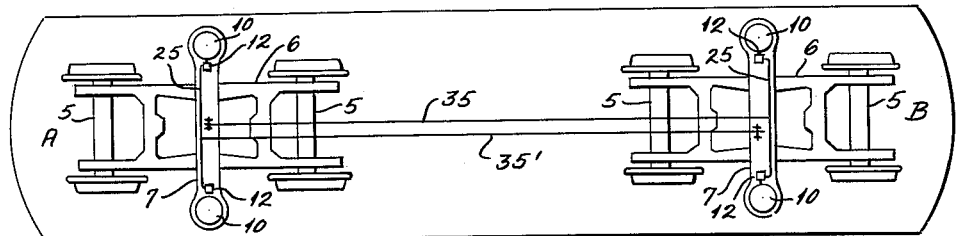
FIGURE 9 is a diagrammatic plan view of a car embodying a third form of the invention.
Figure 10:
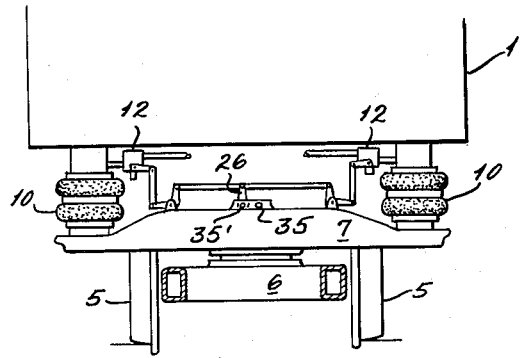
FIGURE 10 is a transverse vertical sectional view of the substantially identical leveling valve linkage arrangements on both of the trucks of FIGURE 9.
Figure 11:
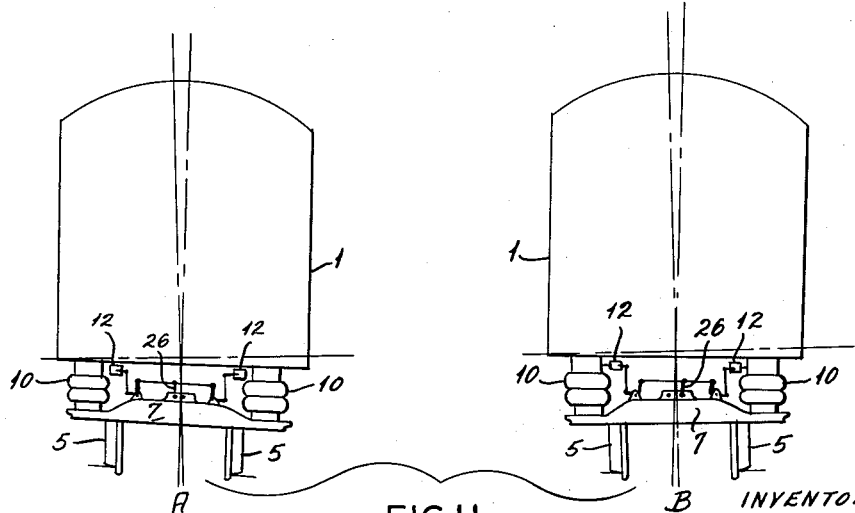
FIGURE 11 is a pair of diagrammatic transverse views of the opposite ends of the car shown in FIGURES 9 and 10 when the supporting track at one end is transversely inclined and the track at the other end is level.

A third embodiment of the invention, illustrated in FIGURES 9 through 11 is provided with leveling valve linkages on each truck similar to that described on the B-end truck in the first embodiment, and the same reference characters are applicable. In this embodiment, shafts 35 and 35' are connected respectively to the cranks 26 on the B-end and A-end trucks so that instead of the lateral tilt of the car body being controlled solely by the leveling valves at the A-end, the body tilt is partially responsive to the transverse inclination of the track at both ends of the car, as best seen in FIGURE 11. Assuming for purpose of illustration, the situation in which the A-end is on super-elevated track and the B-end is on horizontal track as shown in FIGURE 11, the bolsters at each end, remaining substantially parallel to the transverse plane of the track, will cause a slight rotation in opposite directions of the cranks 26 at the opposite end, through shafts 35 and 35', i.e., in FIGURE 11, since the B-end bolster is horizontal, the crank 26 at the A-end will be retained in a vertical position, i.e., perpendicular to the A-end bolster, and the crank 26 at the B-end will lie in a plane extending longitudinally of the truck, i.e., perpendicular to the major axis of the A-end bolster. Thus to restore the level-regulating valves 12 to their normal closed positions, air will be exhausted from the left-hand spring at the A-end and from the right-hand spring at the B-end and additional air admitted to the right-hand spring at the A-end and the left-hand spring at the B-end until both ends of the car body are at the same transverse inclination, at which time the valve operating arms will all be parallel to the car floor and the valves will all be closed.

Various changes in the details of the structures described may be made without departing from the spirit of the invention, and the exclusive use of such modifications as come within the scope of the appended claims is contemplated.

What is claimed is:

1. In a vehicle, wheels and axles spaced apart longitudinally of the vehicle, spring-supporting structure comprising separate transverse members carried by said wheels and axles adjacent each end of the vehicle, upright pneumatic springs spaced apart transversely of the vehicle and carried by each of said separate transverse members, a vehicle body structure supported near its ends on said springs, a source of air under pressure, separate valve devices connected respectively to each of said springs and carried by one of said structures, a connection between each said valve device and said source, each said valve device having a port communicating with the atmosphere, an operating arm on each said valve device for selectively arranging communication through each said valve device between said connected spring and said source and between said spring and the atmosphere and for closing communication through said valve device, a substantially upright link pivoted to the outer end of each said arm, said links at one end of the vehicle being connected to the other of said structures at said one end of the vehicle, linkage carried by the other of said structures at the other end of said vehicle and comprising a pair of laterally-spaced bell cranks fulcrumed on said other structure at said other end and each having a normally horizontal arm pivotally connected to the end of one of said links, a transversely-extending rod connecting the other normally upright arms of said bell cranks, a member fixed to said one structure and tiltable therewith transversely, and means connecting said member to said transverse link and causing corresponding rotation of said bell cranks and lowering and raising their connections to said upright links in accordance with tilting of the said one structure and thus causing operation of said valve device to admit air to and discharge air from said springs in accordance with inclination of said one structure.

2. In a vehicle according ot claim 1, a restricted equalizing passage connecting said transversely-spaced springs at said other end of said vehicle.

3. In a vehicle, wheels and axles spaced apart longitudinally of the vehicle, separate transverse members carried by said wheels and axles adjacent each end of the vehicle, upright pneumatic springs spaced apart transversely of the vehicle and carried by each of said separate transverse members, a vehicle body supported near its ends on said springs, a source of air under pressure, separate valve devices connected respectively to each of said springs and carried by said body, a connection between each said valve device and said source, each said valve device having a port communicating with the atmosphere, an operating arm on each said valve device for selectively arranging communication through each said valve device between said connected spring and said source and between said spring and the atmosphere and for closing communication through said valve device, a substantially upright link pivoted to the outer end of each said arm, said links at one end of the vehicle being connected to the transverse member at said one end of the vehicle, linkage carried by the transverse member at the other end of the vehicle and comprising a pair of laterally-spaced bell cranks fulcrumed on said transverse member and each having a normally substantially horizontal arm pivotally connected to the end of one of said links, a transversely-extending rod connecting the other normally upright arms of said bell cranks, and means transversely tiltable with the vehicle body and connected with said transverse rod and causing therethrough corresponding inclination of said bell cranks and lowering and raising their connections to said upright links in accordance with tilting of the vehicle body and thus causing operation of said valve devices at said other end of the vehicle to admit air to and discharge air from said springs in accordance with inclination of the vehicle body caused by operation of the valves at said one end of the vehicle.

4. In a vehicle, wheels and axles spaced apart longitudinally of the vehicle, separate transverse members carried by said wheels and axles adjacent each end of the vehicle, upright pneumatic springs spaced apart transversely of the vehicle and carried by each of said separate transverse members, a vehicle body supported near its ends on said springs, a source of air under pressure, separate valve devices connected respectively to each of said springs and carried by said body, a connection between said valve device and said source, each said valve device having a port communicating with the atmosphere, an operating arm on each said valve device for selectively arranging communication through each said valve device between each said spring and said source and between each said spring and the atmosphere and for closing communication through said valve device, a substantially upright link pivoted to the outer end of each said arm, said links at one end of the vehicle being connected to the transverse member at said one end of the vehicle, linkages carried by said the transverse member at the other end of the vehicle and comprising a pair of laterally-spaced bell cranks fulcrumed on said transverse member and each having a normally substantially horizontal arm pivotally connected to the end of one of said links, a transversely-extending rod connecting the other normally upright arms of said bell cranks, a shaft extending longitudinally of the vehicle and rigidly connected at one end to the vehicle body, said shaft being journalled at its other end on the transverse member at said other end of the vehicle and rigidly mounting a crank pivotally-connected to said transverse rod whereby to cause said bell cranks to incline similarly to said vehicle body and to lower and raise their connections to said upright links in accordance with tilting of the vehicle body and thus cause operation of said valve devices at said other end of the vehicle to admit air to and discharge air from said springs in accordance with inclination of the vehicle body caused by operation of the valves at said one end of the vehicle.

5. In a vehicle, wheels and axles spaced apart longitudinally of the vehicle, separate transverse members carried by said wheels and axles adjacent each end of the vehicle, upright pneumatic springs spaced apart transversely of the vehicle and carried by each of said separate transverse members, a vehicle body supported near its ends on said springs, a source of air under pressure, separate valve devices connected respectively to each of said springs and carried by said body, a connection between each said valve device and said source, each said valve having a port communicating with the atmosphere, an operating arm on each said valve device for selectively arranging communication through each said valve device between each said spring and said source and between each said spring and the atmosphere and for closing communication through said valve device, a substantially upright link pivoted to the outer end of each said arm, said links at one end of the vehicle being connected to the transverse member at said one end of the vehicle, linkages carried by the transverse member at the other end of the vehicle and comprising a pair of laterally-spaced bell cranks fulcrumed on said transverse member and each having a normally substantially horizontal arm pivotally-connected to the end of said links, a transversely-extending rod connecting the other normally upright arms of said bell cranks, a shaft extending longitudinally of the vehicle and rigidly connected at one end to the transverse member at said one end of the vehicle, said shaft being journaled at its other end on the transverse member at said other end of the vehicle and rigidly mounting a crank pivotally-connected to said transverse rod whereby to cause said bell cranks to incline similarly to said transverse member at said one end of the vehicle and to lower and raise their connections to said upright links in accordance with tilting of the vehicle body and thus cause operation of said valve devices at said other end of the vehicle to admit air to and discharge air from said springs in accordance with inclination of the transverse member at said one end of the vehicle caused by operation of the valves at said one end of the vehicle.

6. In a vehicle, wheels and axles spaced apart longitudinally of the vehicle, separate transverse members carried by said wheels and axles adjacent each end of the vehicle, upright pneumatic springs spaced aparts transversely of the vehicle and carried by each of said separate transverse members, a vehicle body supported near its end on said springs, a source of air under pressure, separate valve devices connected respectively to each of said springs and carried by said body, a connection between each valve device and said source, each said valve device having a port communicating with the atmosphere, an operating arm on each said valve device for selectively arranging communication through each said valve device between each said spring and said source and between each said spring and the atmosphere and for closing communication through said valve device, a substantially upright link pivoted to the outer end of each said arm, linkages carried by each of the transverse members and each comprising a pair of laterally-spaced bell cranks fulcrumed on said transverse members and each having a normally substantially horizontal arm pivotally-connected to the end of one of said links, a transversely extending rod connecting the other normally upright arms of said bell cranks, and a connection between each of said transverse rods and the transverse member at the opposite end of the vehicle for causing said transverse rods to move transversely in proportion to relative tilt of the transverse members at each end of the vehicle and to cause, through said transverse rods, corresponding inclination of said bell cranks and lowering and raising of their connections to said upright links in accordance with such relative tilt and thus to cause operation of said valve devices at both ends of the vehicle to admit air to and discharge air from the connected springs in accordance with said relative tilt.

7. In a railway vehicle, longitudinally-spaced trucks each having wheel and axle assemblies spaced apart longitudinally thereof, a truck frame supported from said assemblies, a bolster pivotally-supported on each said frame on a vertical axis substantially at the center thereof, upright pneumatic springs spaced apart transversely of the vehicle and carried by the end portions of each of said bolsters, a vehicle body supported near its ends on said springs, a source of air under pressure, separate valve devices connected respectively to each of said springs and carried by said body, a connection between each said valve device and said valve device and said source, each said valve having a port communicating with the atmosphere, an operating arm on each valve device for selectively arranging communication through said valve device between each said spring and said source and between each said spring and the atmosphere and for closing communication through said valve device, a substantially upright link pivoted to the outer end of each said arm, said links at one end of the vehicle being connected to the bolster at said one end of the vehicle, a linkage carried by the bolster at the other end of the vehicle and comprising a pair of laterally spaced bell cranks fulcrumed on said bolster and each having a normally substantially horizontal arm pivotally-connected to the end of one of said links, a transversely-extending rod connecting the other normally upright arms of said bell crank, a shaft extending longitudinally of the vehicle and rigidly connected at one end to the vehicle body, said shaft being journaled at its other end on the bolster at said other end of the vehicle and rigidly mounting a crank rigidly-connected to said transverse rod whereby to cause said bell cranks to incline similarly to said vehicle body and to lower and raise their connections to said upright links in accordance with tilting of the vehicle body and thus cause operation of said valve devices at said other end of the vehicle to admit air to and discharge air from said springs in accordance with inclination of the vehicle body caused by operation of the valves at said one end of the vehicle.

8. In a railway vehicle, longitudinally-spaced trucks each having wheel and axle assemblies spaced apart longitudinally thereof, a truck frame supported from said assemblies, a bolster pivotally supported on each said frame on a vertical axis substantially at the center thereof, upright pneumatic springs spaced apart transversely of the vehicle and carried by the end portions of each of said bolsters, a vehicle body supported near its ends on said springs, a source of air under pressure, separate valve devices connected respectively to each of said springs and carried by said body, a connection between each said valve device and said source, each said valve device having a port communicating with the atmosphere, an operating arm on each valve device for selectively arranging communication through said valve device between each said spring and said source and between each said spring and the atmosphere and for closing communication through said valve device, a substantially upright link pivoted to the outer end of each said arm, said links at one end of the vehicle being connected to the bolster at said one end of the vehicle, a linkage carried by the bolster at the other end of the vehicle and comprising a pair of laterally spaced bell cranks fulcrumed on said bolster and each having a normally substantially horizontal arm pivotally-connected to the end of one of said links, a transversely-extending rod connecting the other normally upright arms of said bell crank, a shaft extending longitudinally of the vehicle and rigidly connected at one end to the bolster at said one end of the vehicle, said shaft being journaled at its other end on the bolster at said other end of the vehicle and rigidly mounting a crank rigidly connected to said transverse rod whereby to cause said bell cranks to incline similarly to said vehicle body and to lower and raise their connections to said upright links in accordance with tilting of the vehicle body and thus cause operation of said valve devices at said other end of the vehicle to admit air to and discharge air from said springs in accordance with inclination of the vehicle body caused by operation of the valves at said one end of the vehicle.

9. In a railway vehicle, longitudinally-spaced trucks each having wheel and axle assemblies spaced apart longitudinally thereof, framing supported from said assemblies, a bolster pivotally-supported on each said framing on a vertical axis substantially at the center thereof, upright pneumatic springs spaced apart transversely of the vehicle and carried by the end portions of each of said bolsters, a vehicle body supported near its ends on said springs, a source of air under pressure, separate valve devices connected respectively to each of said springs and carried by said body, a connection between each said valve device and said source, each said valve device having a port communicating with the atmosphere, an operating arm on each valve device for selectively arranging communication through said valve device between each said spring and the atmosphere and for closing communication through said valve device, a substantially upright link pivoted to the outer end of each said arm, linkages carried by each of the bolsters and each comprising a pair of laterally spaced bell cranks fulcrumed on said bolsters and each having a normally substantially horizontal arm pivotally-connected to the end of one of said links, a transversely-extending rod connecting the other normally upright arms of said bell cranks, and a connection between each of said transverse rods and the bolster at the opposite end of the vehicle for causing said transverse rods to move transversely in proportion to relative tilt of the bolsters at each end of the vehicle and to cause, through said transverse rods, corresponding inclination of said bell cranks and lowering and raising of their connections to said upright links in accordance with such relative tilt and thus to cause operation of said valve devices at both ends of the vehicle to admit air to and discharge air from the connected springs in accordance with said relative tilt.

10. A railway vehicle truck comprising wheel and axle assemblies, a frame supported therefrom, a transversely extending bolster pivotally-supported on said frame, upright pneumatic springs carried by the end portions of said bolster and including upper and lower portions vertically movable with respect to each other, a valve device adjacent each of said springs and movable with the upper portion thereof, each said valve device being adapted for connection to a source of compressed air, and having a connection to the adjacent spring and a port communicating with the atmosphere, an operating arm on each valve device for selectively arranging communication through said valve device between each said spring and a source of compressed air and between each said spring and the atmosphere and for closing communication through said valve device, a substantially upright link pivoted to the outer end of each said arm, linkages carried by the bolster and comprising a pair of laterally-spaced bell cranks fulcrumed on said bolster and each having a normally substantially horizontal arm pivotally-connected to the lower end portion of one of said links, a transversely extending rod connecting the other normally upright arms of said bell cranks to each other, and a shaft extending longitudinally of the truck and journaled on said bolster, a crank rigidly mounted on said shaft and pivotally-connected to said transverse rod, said shaft being adapted for connection at its other end to a portion of the supported vehicle other than said truck and rotatable in accordance with relative tilting movements between the other portion and said bolster for causing said bell cranks to incline similarly to the other portion of the vehicle and to lower and raise their connections to said upright links and thus accordingly vary the air pressure in the opposite springs.

11. In a vehicle, wheels and axles spaced apart longitudinally of the vehicle, separate spring-supporting structures carried by said wheels and axles adjacent to each end of the vehicle, upright fluid pressure springs spaced apart transversely of the vehicle and carried by said spring-supporting structure at each end of the vehicle, a vehicle body structure supported near its ends on said springs, a source of compressed air on said vehicle, separate normally closed valves each connected to said source and to each spring and including means responsive to changes in the vertical distance between said spring-supporting structures and said vehicle body structure for operating said valves to admit air under pressure to the connected spring when said vertical distance is lower than a pre-determined value and to reduce the air pressure from the connected spring when said vertical distance is higher than a pre-determined value, means connected to the valves on one of said spring-supporting structures and extending toward said other spring-supporting structure and connected to one of the structures other than the one spring-supporting structure and operable in accordance with transverse tilting movement of one of the structures at the point of connection to operate the valves whereby the valve on the low side is operated to increase the pressure in its related spring structure and the valve on the high side is operated to reduce the pressure in its related spring structure and the valves are closed when the one structure is stably supported to maintain pressure equal in the springs.

12. In a vehicle structure as set forth in claim 11 wherein the valves at a first end of the vehicle structure are independent of each other and the last-mentioned means is connected to the valves at the first end and to one of the structures at a second end of the vehicle.

13. In a vehicle, a body structure, wheels and axles spaced apart longitudinally of said body structure, structure supporting said body on the wheels and the axles adjacent one end thereof and maintaining said body structure substantially parallel, spring supporting structure carried by said wheels and axles adjacent the other end of said body structure, upright fluid pressure springs spaced apart transversely of the vehicle and carried by said spring supporting structure at said other end, a source of compressed air on the vehicle, separate normally closed valves each connected to said source and to said springs and including means responsive to changes in the vertical distance between said spring supporting structure and said body structure for operating said valves to admit air under pressure to the connected spring when said vertical distance is lower than a predetermined value and to reduce the air pressure in the connected spring when said vertical distance is higher than a predetermined value and preventing the ingress to or egress of air from said spring when said vertical distance is between said predetermined valves, means connected to the valves on the spring supporting structure and extending toward the said other spring supporting structure and connected to one of the structures other than the one spring supporting structure operable in accordance with the transverse tilting movement of one of the structures at the point of connection to operate the valves whereby the valve on the low side is operated to increase the pressure in its related spring structure and the valve on the high side is operated to reduce the pressure in its related spring structure and the valves are closed when the one structure is stably supported to maintain pressure equal in the springs.

14. In a railway vehicle, longitudinally spaced trucks each having wheel and axle assemblies spaced apart longitudinally thereof, framing supported from said assemblies, a transverse bolster structure pivotally supported on said framing on a vertical axis substantially at the center thereof, laterally spaced upright fluid pressure springs carried on the end portions of each bolster structure, and a vehicle body structure supported adjacent its ends on said springs, a source of compressed air on said vehicle, separate, normally closed valves each connected to said source and to each spring and including means responsive to changes in vertical distance between the ends of said bolster structures and said body structure for operating said valves to admit air under pressure to the connected spring when said vertical distance is lower than a predetermined value and to reduce the air pressure in the connected spring when said vertical distance is higher than a predetermined value and preventing the admission to or reduction of air from said spring when the vertical distance lies between the predetermined values, means connected to the valves associated with the springs supported on one of the bolster structures and extending toward said other bolster structure and connected to one of the structures other than the one bolster structure and operable in accordance with transverse tilting movement of one of the structures at the point of connection to operate the valves whereby the valve on the low side is operated to increase the pressure in its related spring structure and the valve on the high side is operated to reduce the pressure in its related spring structure and the valves are closed when the one structure is stably supported to maintain pressure equal in the springs.

15. In a railway vehicle, longitudinally spaced trucks each having wheel and axle assemblies spaced apart longitudinally thereof, framing supported from said assemblies, a transverse bolster structure pivotally supported on said framing on a vertical axis substantially at the center thereof, laterally spaced upright fluid pressure springs carried on the end portions of each bolster structure, and a vehicle body structure supported adjacent its ends on said springs, a source of compressed air on said vehicle, separate, normally closed valves each connected to said source and to each spring and including means responsive to changes in vertical distance between the ends of said bolster structures and said body structure for operating said valves to admit air under pressure to the connected spring when said vertical distance is lower than a predetermined value and to reduce the air pressure in the connected spring when said vertical distance is higher than a predetermined value and preventing the admission to or reduction of air from said spring when the vertical distance lies between the predetermined values, a first means connected to the valves associated with the springs supported on one of the bolster structures at a first end of the vehicle and extending toward the outer bolster structure at another end of the vehicle and connected to one of the structures at said other end of the vehicle, a second means connected to the valves associated with the springs supported on one of the bolster structures at said other end of the vehicle and extending toward said bolster structure at said first end of the vehicle and connected to one of the structures at said first end of the vehicle, each of the means being operable in accordance with transverse tilting movement of one of the structures at the points of connection to operate the valves at the opposite end of the vehicle whereby the valves on the low side is operated to increase the pressure in its related spring structure and the valve on the high side is operated to reduce the pressure in its related spring structure and the valves are closed when the structures are stably supported to maintain pressure equal in the springs.

References Cited in the file of this patent

UNITED STATES PATENTS

| | | |
|---|---|---|
| 804,001 | Fenske | Nov. 7, 1905 |
| 976,845 | Blake | Nov. 29, 1910 |
| 2,633,811 | Poage | Apr. 7, 1953 |